US00RE44849E

(19) United States
(12) Reissued Patent
Grey

(10) Patent Number: US RE44,849 E
(45) Date of Reissued Patent: Apr. 22, 2014

(54) SINGLE LAYER, TWO DIFFERENT SIDED HAIR WRAP

(76) Inventor: Gary Grey, New York, NY (US)

(21) Appl. No.: 12/837,336

(22) Filed: Jul. 15, 2010

Related U.S. Patent Documents

Reissue of:
(64) Patent No.: 7,634,819
Issued: Dec. 22, 2009
Appl. No.: 11/805,209
Filed: May 22, 2007

U.S. Applications:
(60) Provisional application No. 60/908,492, filed on Mar. 28, 2007.

(51) Int. Cl.
*A42B 5/00* (2006.01)

(52) U.S. Cl.
USPC ..... 2/207

(58) Field of Classification Search
USPC ..... 2/171, 206, 207, 174, 81; 132/273, 275, 132/200; 28/159, 160, 162; 428/85, 193; 442/208, 209, 216, 301
See application file for complete search history.

(56) References Cited

U.S. PATENT DOCUMENTS

| | | | | | |
|---|---|---|---|---|---|
| 1,554,163 | A | * | 9/1925 | Lipper | 66/171 |
| 2,595,657 | A | * | 5/1952 | Harmon | 132/273 |
| 2,942,442 | A | * | 6/1960 | Michael-Lohs | 66/174 |
| 3,327,720 | A | * | 6/1967 | Carmony et al. | 132/274 |
| 3,392,737 | A | * | 7/1968 | Fefferman | 132/274 |
| 3,471,867 | A | * | 10/1969 | Kirchhoff | 2/207 |
| 3,522,813 | A | * | 8/1970 | Corey | 132/274 |
| 3,561,455 | A | * | 2/1971 | Gregg | 132/274 |
| 3,587,114 | A | * | 6/1971 | McCourtie | 2/67 |
| 3,725,956 | A | * | 4/1973 | Reisen | 2/171 |
| 3,746,015 | A | * | 7/1973 | Schulman | 132/212 |
| 3,889,289 | A | * | 6/1975 | Kubach | 360/6 |
| 3,889,298 | A | * | 6/1975 | Miska | 2/174 |
| 4,790,035 | A | * | 12/1988 | Whyte | 2/207 |
| 4,964,175 | A | * | 10/1990 | Taylor | 2/171 |
| 5,083,318 | A | * | 1/1992 | Hook | 2/207 |
| 5,265,278 | A | * | 11/1993 | Watanabe | 2/174 |
| 5,477,561 | A | * | 12/1995 | Adkins | 2/174 |
| 5,850,636 | A | * | 12/1998 | Reuven | 2/174 |

(Continued)

FOREIGN PATENT DOCUMENTS

CA 2431336 * 6/2003

OTHER PUBLICATIONS

Notification of Transmittal of, and the International Search Report and the Written Opinion of the International Searching Authority, mailed Sep. 11, 2008, International Patent Application No. PCT/US2008-006059 (8 pages).

(Continued)

*Primary Examiner* — Katherine Moran
(74) *Attorney, Agent, or Firm* — Tarter Krinsky & Drogin LLP

(57) ABSTRACT

A head wrap or scarf in a single layer having a first side that is more slippery against another surface and a second side that is rougher and less slippery than the first side. The single layer is formed of two fibers of two different materials with a greater proportion of a first slippery fabric toward the first side of the head wrap and a greater proportion of rougher fabric toward the second side of the head wrap.

3 Claims, 2 Drawing Sheets

(56) References Cited

U.S. PATENT DOCUMENTS

| | | | | |
|---|---|---|---|---|
| 5,858,888 | A * | 1/1999 | Underwood et al. | 442/286 |
| 6,024,103 | A * | 2/2000 | Hansbury | 132/275 |
| 6,295,992 | B1 * | 10/2001 | Sapp | 132/200 |
| 6,567,991 | B1 | 5/2003 | Holslag et al. | 2/181.4 |
| 6,625,817 | B2 | 9/2003 | Wasmuth | 2/174 |
| 6,799,581 | B2 | 10/2004 | Cave | 132/273 |
| 7,465,683 | B2 * | 12/2008 | McMurray | 442/314 |
| 2006/0085891 | A1 * | 4/2006 | Larkin et al. | 2/171 |
| 2006/0162046 | A1 | 7/2006 | Chudzik et al. | 2/174 |
| 2007/0118971 | A1 | 5/2007 | Blecha | |
| 2007/0269630 | A1 | 11/2007 | Silver | |

OTHER PUBLICATIONS

Black Fur Bonnet & Padded Lining With Pom Poms=One Size; Ebay Web Page: <http://cgi.ebay.com/BLACK-FUR-BONNET-PADDED-LINING-WITH-POM-POMS-ONE-SIZE_W0QQitemZ110050410962QQihZ001QQcategory Z45232QQcmdZViewItem>; total 5 pages.

Fiona Satin Sleep Bonnet; Web page: <http://www.mimialamode.com/cart/iteminfor.php?II=39&cat=14>; total 2 pages.

Flannel Sleep Bonnet; Web Page: <http://www.tenderheaded.com/flslbo.html>; total 1 page.

Satin Sleep Bonnet; Web Page: <http://www.tenderheaded.com/bonwitnet.html>; total 2 pages.

* cited by examiner

SINGLE LAYER, TWO DIFFERENT SIDED HAIR WRAP

Matter enclosed in heavy brackets [ ] appears in the original patent but forms no part of this reissue specification; matter printed in italics indicates the additions made by reissue.

CROSS-REFERENCE TO RELATED APPLICATION

The present application is based on and claims priority to U.S. Provisional Application Ser. No. 60/908,492, filed on Mar. 28, 2007 and entitled "SINGLE LAYER, TWO DIFFERENT SIDED HAIR WRAP," the entire contents of which is hereby incorporated by reference.

BACKGROUND OF THE INVENTION

The present invention relates to a fabric head wrap or hair covering particularly useful to be worn when the head rests against another surface, such as a pillow during sleep.

While sleeping, a person who has a hairstyle that she wishes to preserve would prefer that her hair not rub on a pillow or surface on which she is lying, as that may mess the hairstyle. To prevent that, a hair covering such as a bonnet, scarf or other wrap, is applied on or wrapped around the head to hold the hairstyle in place. However, when the head with the hair wrap lies on a pillow, especially during sleep when the head moves periodically, the fabric of the head wrap will drag on the fabric of the pillow and possibly cause the head wrap to slide over or off the hair, disturbing the hairstyle beneath the wrap.

An additional problem experienced by many women of African descent is that their hair breaks easily. Much hair breakage among such women occurs during the night due to rubbing and friction between the hair and the pillow. Additionally, their hair is difficult to manage and to style. As a result, many women of African descent sleep wearing a fabric head wrap.

Head wraps come in various shapes and styles including a bonnet, a cap, a scarf, a smaller wrap covering less than the entire head, etc.

The art has attempted to avoid the problem of friction between the hair and the pillow by providing a wrap for the head wherein the pillow contacting surface of the wrap is of a fabric or material that is likely to slide over the surface of the pillow rather than to be restrained by it. Satin is used for many head wraps because it is slippery and reduces friction and rubbing against a pillow. Unfortunately, a satin head wrap is also slippery on the inside against the hair. That can cause a problem for a wearer during sleep because the slippery interior of the wrap tends to slide off the hair during the night. For this reason, many wearers of head wraps avoid the use of satin wraps altogether.

To solve this problem, prior art shows two layer head coverings, including a first slippery layer on the outside that rests against the pillow and a less slippery or rougher second layer on the inside that contacts the hair with sufficient friction that the head wrap will not slide off the hair. An example of this is in U.S. Pat. No. 3,561,455.

Other two layer head coverings, although perhaps not of the slide preventing type that the Applicant here proposes, are found in U.S. Pat. Nos. 3,889,298; 6,567,991; 6,799,581; and U.S. Publication 2006/0162046.

SUMMARY OF THE INVENTION

No head wraps known to the Applicant have comprised a single layer head wrap that has both a slippery external surface characteristic and a rougher internal surface characteristic in a single layer of material. A single layer is desirable because it is easy to handle, there will be no apparent slippage between two separate layers and a single layer can be made thin, so that the head wrap is easily folded, rolled, formed to the head and is very flexible.

According to the invention, a single layer head wrap may be made of a knitted material that is knitted from two types of yarn. The yarn at the outside of the wrap has a greater proportion of a slippery satin material and the yarn at the inside has a greater proportion of preferably a rougher or even a textured material. Thus, in a single knitting process, both a slippery outside and rough inside of a single layer head wrap are produced. This process produces a single layer with the benefit of the slippery aspect of a satin fabric on the outside and a soft, cushioned, textured inside that holds on the hair and prevents the wrap from sliding during sleep. This combination will avoid messing of the hairstyle.

This wrap is a one layer material with two distinct, different sides, rather than two pieces of materials joined or laminated together. A single piece of material is preferred over two joined pieces because it is light, easily moldable, easily tieable, as a head wrap should be comfortable, and the single layer "breathes", allowing moisture of perspiration, etc. out and air in.

DESCRIPTION OF PREFERRED EMBODIMENTS

Figure 1:
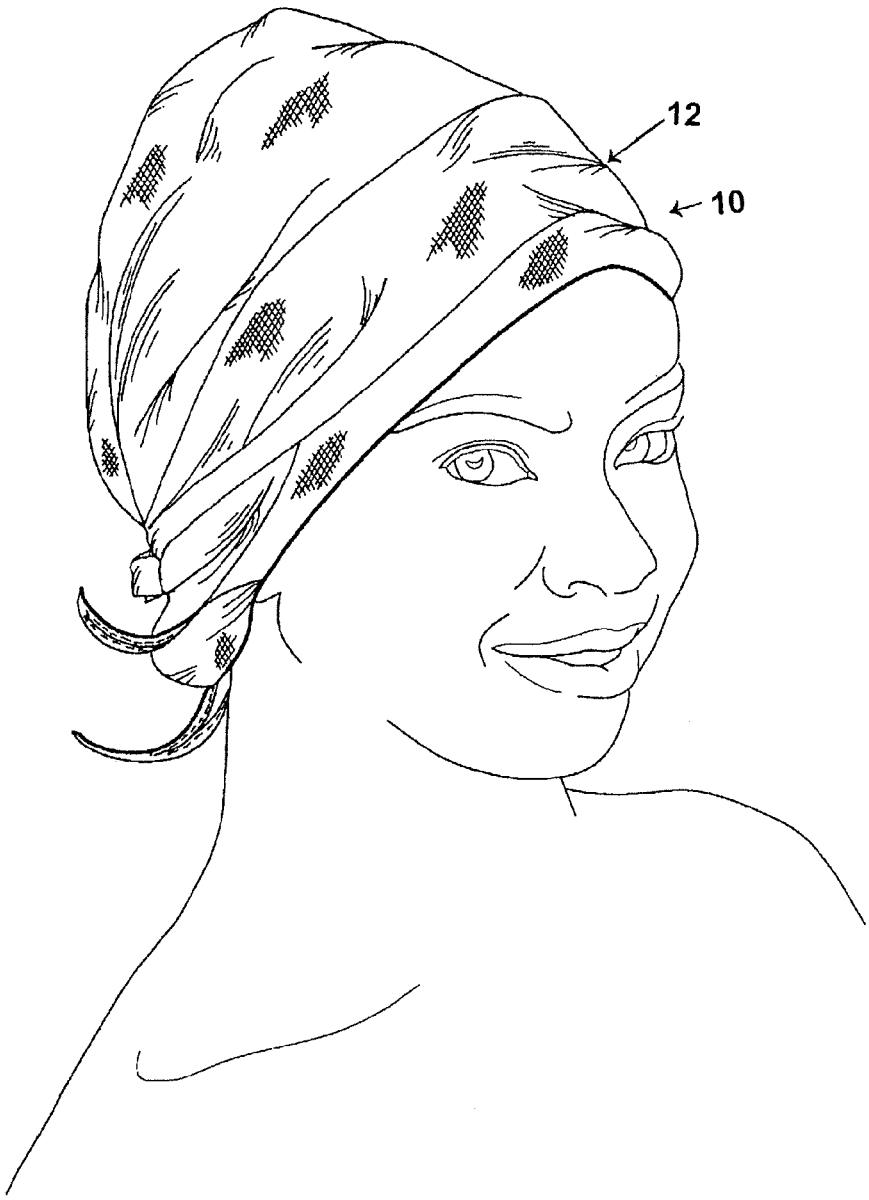
FIG. 1 shows a head scarf on a person.

The head wrap, and more particularly the head scarf 10 in FIG. 1 is a single layer of a fabric. It has a slippery, satin-like exterior 12. Not seen in FIG. 1 is its rougher interior which faces toward the hair, so that the scarf will not shift.

Figure 2:
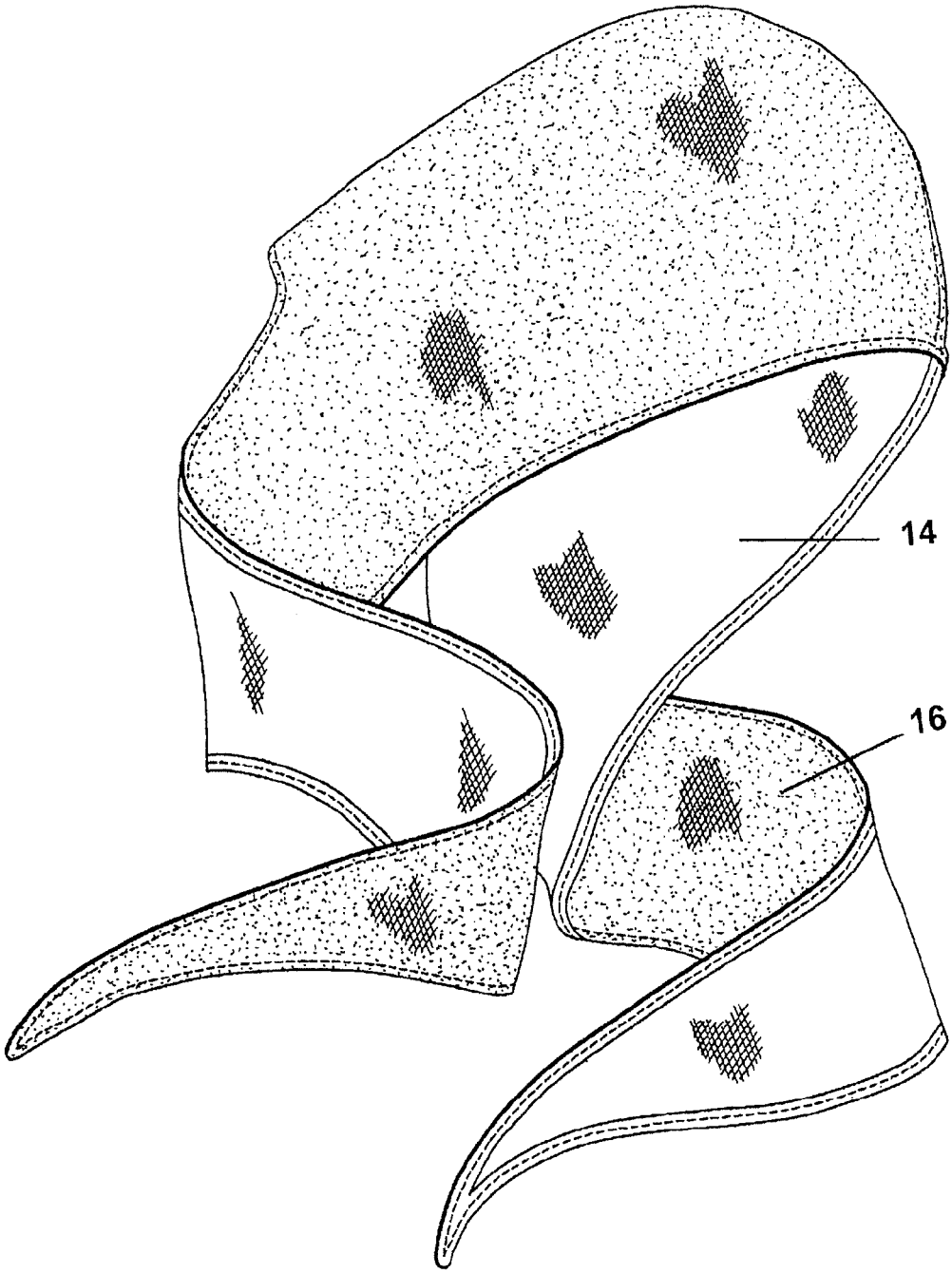
FIG. 2 shows another type of head wrap formed in a single layer.

The head wrap of FIG. 2, which may also be called a scarf, is a single layer of material. It has slippery, satin-like exterior 14 and a rougher interior 16.

*As can be seen in, for example, FIG. 2, in certain embodiments the head wrap or scarf has a length many times greater than its width, or at least twice as large as the width so as to facilitate wrapping on a human head.*

One suggested material for the single fabric layer in both of FIGS. 1 and 2 is made using a 28 gauge 30 inch diameter circular double knit knitting machine. 50 denier 36 filament bright polyester yarn is used in the knitting to be predominant on the outer face of the fabric to make that surface relatively slippery against another fabric, e.g., on a pillow, and 50 denier 36 filament textured polyester yarn is used in the knitting to be predominant on the back or head side of the fabric wrap to make that surface relatively rougher against a wearer's hair. The machine is set to knit 40 stitches per inch. A known double knit machine may be used to knit the scarf or head wrap.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

[1. A head wrap or scarf having a width and a length at least twice as large as the width so as to facilitate wrapping on a human head, the head wrap or scarf comprising:

a single knitted layer with a first side and a second side facing in an opposite direction than the first side;

a first fiber and a second fiber each comprised in each of the first side and the second side;

the first side being slippery when in contact against a surface and the second side being rougher and less slippery when in contact against the surface than the first side;

the first fiber is comprised of a first material different from a material of the second fiber, and the first fiber is more slippery and the second fiber is rougher and less slippery than the first fiber, wherein a greater proportion of the first fiber and a smaller proportion of the second fiber is toward the first side and a greater proportion of the second fiber and a smaller proportion of the first fiber is toward the second side.]

[2. The head wrap or scarf of claim 1, further comprising a first end and a second end disposed at an opposite distal portion along the length of the head wrap or scarf from the first end, the first end and the second end both being narrower than the width at a center of the head wrap or scarf.]

*3. A head wrap or scarf for a human head, the head wrap or scarf comprising a single knitted layer having a first side and a second side facing in the opposite direction than the first side;*

*each of the first side and second side comprising a first fiber and a second fiber, the first fiber being slippery when in contact against a surface and the second fiber being less slippery when in contact against the surface;*

*wherein a greater proportion of the first fiber than the second fiber is present on the first side of the single knitted layer, and a greater proportion of the second fiber than the first fiber is present on the second side of the single knitted layer, such that when the second side of the head wrap or scarf is contacted with the human head, the head wrap or scarf will not slide off the human head.*

*4. The head wrap or scarf of claim 3, the head wrap or scarf having a width and a length of at least twice as large as the width so as to facilitate wrapping on a human head.*

*5. The head wrap or scarf of claim 4, further comprising a first end and a second end disposed at an opposite distal portion along the length of the head wrap or scarf from the first end, the first end and the second end both being narrower than the width at a center of the head wrap or scarf.*

* * * * *